(12) United States Patent
Haddad et al.

(10) Patent No.: US 11,953,764 B2
(45) Date of Patent: Apr. 9, 2024

(54) TUNABLE LENSES WITH ENHANCED PERFORMANCE FEATURES

(71) Applicant: Optica Amuka (A.A.) Ltd., Petach Tikva (IL)

(72) Inventors: Yariv Haddad, Raanana (IL); Yuval Vardy, Tel Aviv (IL); Alex Alon, Binyamina (IL); Yoav Yadin, Ganey Tikva (IL)

(73) Assignee: OPTICA AMUKA (A.A.) LTD., Petach Tikva (IL)

( * ) Notice: Subject to any disclaimer, the term of this patent is extended or adjusted under 35 U.S.C. 154(b) by 369 days.

(21) Appl. No.: 17/255,452

(22) PCT Filed: Jul. 22, 2019

(86) PCT No.: PCT/IB2019/056243
§ 371 (c)(1),
(2) Date: Dec. 23, 2020

(87) PCT Pub. No.: WO2020/021431
PCT Pub. Date: Jan. 30, 2020

(65) Prior Publication Data
US 2021/0311356 A1 Oct. 7, 2021

Related U.S. Application Data

(63) Continuation-in-part of application No. PCT/IB2018/054957, filed on Jul. 5, 2018.
(Continued)

(51) Int. Cl.
*G02F 1/00* (2006.01)
*G02C 7/08* (2006.01)
(Continued)

(52) U.S. Cl.
CPC ........... *G02F 1/0018* (2013.01); *G02C 7/083* (2013.01); *G02F 1/0316* (2013.01);
(Continued)

(58) Field of Classification Search
CPC ............. G02F 1/133526; G02F 1/0018; G02F 1/0316; G02F 1/19; G02C 7/02;
(Continued)

(56) References Cited

U.S. PATENT DOCUMENTS 3,580,661 A  5/1971  Cooper, Jr. et al.
3,881,921 A  5/1975  Frank
(Continued)

FOREIGN PATENT DOCUMENTS

CN   201752480 U    3/2011
CN   102253563 A   11/2011
(Continued)

OTHER PUBLICATIONS

CA Application # 2,947,809 Office Action dated Apr. 19, 2021.
(Continued)

*Primary Examiner* — Christopher Stanford
*Assistant Examiner* — Journey F Sumlar
(74) *Attorney, Agent, or Firm* — Kligler & Associates Patent Attorneys Ltd.

(57) ABSTRACT

Optical apparatus (38) includes an electro-optical layer (46), contained within a transparent envelope (43, 44) and having an effective local index of refraction at any given location that is determined by a voltage waveform applied across the electro-optical layer at the location. An array of excitation electrodes (50) is disposed over a surface of the transparent envelope. Control circuitry (42) is configured to apply voltage waveforms to the excitation electrodes so as to generate across at least a part of the active area of the electro-optical layer a phase modulation profile (60, 63, 64,
(Continued)

65, 66, 67, 70) comprising spatially alternating peaks (61) and troughs (62) separated by phase transitions chosen so as to emulate a Fresnel lens. The troughs have respective phase modulation depths that vary by at least one quarter wavelength at a nominal wavelength of 500 nm across at least the part of the active area of the electro-optical layer that emulates the Fresnel lens.

32 Claims, 6 Drawing Sheets

Related U.S. Application Data

(60) Provisional application No. 62/701,857, filed on Jul. 23, 2018, provisional application No. 62/586,909, filed on Nov. 16, 2017, provisional application No. 62/530,306, filed on Jul. 10, 2017.

(51) Int. Cl.
*G02F 1/03* (2006.01)
*G02F 1/1335* (2006.01)
*G02F 1/19* (2019.01)
*G02B 27/01* (2006.01)

(52) U.S. Cl.
CPC .......... *G02F 1/133526* (2013.01); *G02F 1/19* (2013.01); *G02B 2027/0178* (2013.01)

(58) Field of Classification Search
CPC .......... G02C 7/08; G02C 7/081; G02C 7/083; G02C 7/085; G02C 7/086; G02C 2202/20; G02B 2027/0178
See application file for complete search history.

(56) References Cited

U.S. PATENT DOCUMENTS

| | | |
|---|---|---|
| 4,190,330 A | 2/1980 | Berreman et al. |
| 4,300,818 A | 11/1981 | Schachar |
| 4,584,592 A | 4/1986 | Tuan et al. |
| 4,853,764 A | 8/1989 | Sutter |
| 5,073,021 A | 12/1991 | Marron |
| 5,212,583 A | 5/1993 | Vali et al. |
| 5,359,444 A | 10/1994 | Piosenka et al. |
| 5,757,546 A | 5/1998 | Lipton et al. |
| 5,815,233 A | 9/1998 | Morokawa et al. |
| 5,861,936 A | 1/1999 | Sorensen |
| 5,861,940 A | 1/1999 | Robinson et al. |
| 6,152,563 A | 11/2000 | Hutchinson et al. |
| 6,243,063 B1 | 6/2001 | Mayhew et al. |
| 6,369,933 B1* | 4/2002 | O'Callaghan .......... G06E 3/005 359/247 |
| 6,491,394 B1 | 12/2002 | Blum et al. |
| 6,501,443 B1 | 12/2002 | Mcmahon |
| 6,517,203 B1 | 2/2003 | Blum et al. |
| 6,553,504 B1 | 4/2003 | Katzenelson et al. |
| 6,857,741 B2 | 2/2005 | Blum et al. |
| 6,888,661 B1* | 5/2005 | Islam .......... G02F 1/13 359/359 |
| 6,986,579 B2 | 1/2006 | Blum et al. |
| 7,475,984 B2 | 1/2009 | Blum et al. |
| 7,475,985 B2 | 1/2009 | Blum et al. |
| 7,497,121 B2 | 3/2009 | Okuda et al. |
| 7,517,083 B2 | 4/2009 | Blum et al. |
| 7,600,872 B2 | 10/2009 | Esser et al. |
| 7,728,949 B2 | 6/2010 | Clarke et al. |
| 8,028,473 B2 | 10/2011 | Galstian et al. |
| 8,052,278 B2 | 11/2011 | Bovet et al. |
| 8,675,148 B2 | 3/2014 | Takagi et al. |
| 8,690,321 B2 | 4/2014 | Lapstun |
| 8,773,629 B2 | 7/2014 | Uehara et al. |
| 8,896,772 B2 | 11/2014 | Fraval et al. |
| 8,922,902 B2 | 12/2014 | Blum et al. |
| 9,052,514 B2 | 6/2015 | Takama |
| 9,241,669 B2 | 1/2016 | Pugh et al. |
| 9,304,319 B2 | 4/2016 | Bar-Zeev et al. |
| 9,541,774 B2 | 1/2017 | Machida et al. |
| 9,958,703 B2 | 5/2018 | Pugh et al. |
| 10,036,901 B2 | 7/2018 | Yadin et al. |
| 10,268,050 B2 | 4/2019 | To et al. |
| 10,288,904 B2 | 5/2019 | Yadin et al. |
| 10,466,391 B2 | 11/2019 | Yadin et al. |
| 2002/0044125 A1 | 4/2002 | Maltese |
| 2003/0058406 A1 | 3/2003 | Blum et al. |
| 2003/0128416 A1 | 7/2003 | Caracci et al. |
| 2003/0210377 A1 | 11/2003 | Blum et al. |
| 2003/0231293 A1 | 12/2003 | Blum et al. |
| 2004/0041745 A1 | 3/2004 | Chen |
| 2004/0160389 A1 | 8/2004 | Suyama |
| 2004/0169630 A1 | 9/2004 | Ide |
| 2005/0146495 A1 | 7/2005 | Mackinnon et al. |
| 2005/0162367 A1 | 7/2005 | Kobayashi et al. |
| 2005/0168430 A1 | 8/2005 | Nishimura et al. |
| 2006/0034003 A1 | 2/2006 | Zalevsky |
| 2006/0066808 A1 | 3/2006 | Blum et al. |
| 2006/0092340 A1 | 5/2006 | Blum et al. |
| 2006/0126698 A1 | 6/2006 | Blum et al. |
| 2006/0164593 A1 | 7/2006 | Peyghambarian et al. |
| 2006/0164687 A1 | 7/2006 | Huang et al. |
| 2007/0052876 A1 | 3/2007 | Kaufman et al. |
| 2007/0146873 A1 | 6/2007 | Ortyn et al. |
| 2007/0236769 A1 | 10/2007 | Zalevsky |
| 2007/0236800 A1 | 10/2007 | Cakmakci et al. |
| 2007/0280626 A1 | 12/2007 | Haddock et al. |
| 2007/0290972 A1 | 12/2007 | Meredith |
| 2008/0239420 A1 | 10/2008 | McGrew |
| 2009/0096981 A1 | 4/2009 | Clarke et al. |
| 2009/0103044 A1 | 4/2009 | Duston et al. |
| 2009/0237575 A1 | 9/2009 | Tsi-shi |
| 2009/0279050 A1 | 11/2009 | McGinn et al. |
| 2010/0007804 A1 | 1/2010 | Guncer |
| 2010/0026920 A1 | 2/2010 | Kim et al. |
| 2010/0149444 A1 | 6/2010 | Hikmet et al. |
| 2010/0157181 A1 | 6/2010 | Takahashi |
| 2011/0018903 A1 | 1/2011 | Lapstun et al. |
| 2011/0037837 A1 | 2/2011 | Chiba et al. |
| 2011/0228181 A1 | 9/2011 | Jeong et al. |
| 2011/0234934 A1 | 9/2011 | Chang |
| 2011/0317128 A1 | 12/2011 | Guilloux et al. |
| 2012/0098875 A1 | 4/2012 | Shinkai et al. |
| 2012/0099040 A1 | 4/2012 | Robinson et al. |
| 2012/0120333 A1 | 5/2012 | Chen et al. |
| 2012/0133891 A1 | 5/2012 | Jiang |
| 2012/0147038 A1 | 6/2012 | Perez et al. |
| 2012/0194781 A1 | 8/2012 | Agurok |
| 2012/0212696 A1 | 8/2012 | Trajikovska et al. |
| 2012/0257131 A1 | 10/2012 | Galstian et al. |
| 2012/0300171 A1 | 11/2012 | Gupta et al. |
| 2013/0010256 A1 | 1/2013 | Haddock et al. |
| 2013/0027655 A1 | 1/2013 | Blum et al. |
| 2013/0128229 A1 | 5/2013 | Huang |
| 2013/0208224 A1 | 8/2013 | Kizu et al. |
| 2013/0215374 A1 | 8/2013 | Blum et al. |
| 2013/0250193 A1 | 9/2013 | Yun et al. |
| 2013/0250223 A1 | 9/2013 | Takagi et al. |
| 2014/0036172 A1 | 2/2014 | Trajkovska-Broach et al. |
| 2014/0036183 A1 | 2/2014 | Asatryan et al. |
| 2014/0118644 A1 | 5/2014 | Liu et al. |
| 2014/0347405 A1 | 11/2014 | Kumeta |
| 2015/0116304 A1 | 4/2015 | Lee et al. |
| 2015/0185503 A1 | 7/2015 | Tate et al. |
| 2015/0219893 A1 | 8/2015 | Chen et al. |
| 2015/0378240 A1 | 12/2015 | Wang et al. |
| 2016/0004128 A1 | 1/2016 | Wu |
| 2016/0161767 A1 | 6/2016 | Childers |
| 2016/0209647 A1 | 7/2016 | Fursich |
| 2016/0370605 A1 | 12/2016 | Ain-Kedem |
| 2017/0003519 A1 | 1/2017 | Burkert et al. |
| 2017/0068134 A1 | 3/2017 | Yadin et al. |
| 2017/0160518 A1 | 6/2017 | Lanman et al. |
| 2017/0184848 A1 | 6/2017 | Vallius |

(56) References Cited

U.S. PATENT DOCUMENTS

| | | |
|---|---|---|
| 2017/0219828 A1 | 8/2017 | Tsai et al. |
| 2017/0269453 A1 | 9/2017 | Galstian et al. |
| 2017/0276963 A1 | 9/2017 | Brennan et al. |
| 2018/0136486 A1 | 5/2018 | Macnamara et al. |
| 2018/0356652 A1 | 12/2018 | Shibuya et al. |
| 2019/0113772 A1 | 4/2019 | Yadin et al. |
| 2020/0003933 A1 | 1/2020 | Yadin et al. |
| 2020/0285062 A1 | 9/2020 | Grutman et al. |
| 2020/0292848 A1 | 9/2020 | Yadin et al. |

FOREIGN PATENT DOCUMENTS

| | | |
|---|---|---|
| CN | 207380380 U | 5/2018 |
| CN | 108845433 A | 11/2018 |
| EP | 0595705 A1 | 5/1994 |
| EP | 1050775 A1 | 11/2000 |
| EP | 1760515 A2 | 3/2007 |
| EP | 2309310 A1 | 4/2011 |
| EP | 2503787 A1 | 9/2012 |
| EP | 2682810 A1 | 1/2014 |
| JP | S62209412 A | 9/1987 |
| JP | H0289017 A | 3/1990 |
| JP | H036518 A | 1/1991 |
| JP | 2003091013 A | 3/2003 |
| JP | 2011203457 A | 10/2011 |
| JP | 2012141552 A | 7/2012 |
| RU | 2541819 C2 | 2/2015 |
| WO | 8102795 A1 | 10/1981 |
| WO | 9941639 A1 | 8/1999 |
| WO | 03077012 A2 | 9/2003 |
| WO | 2006034652 A1 | 4/2006 |
| WO | 2007041796 A1 | 4/2007 |
| WO | 2008032061 A2 | 3/2008 |
| WO | 2011075834 A1 | 6/2011 |
| WO | 2012120470 A1 | 9/2012 |
| WO | 2014063432 A1 | 5/2014 |
| WO | 2017003330 A1 | 1/2017 |
| WO | 2017049072 A1 | 3/2017 |
| WO | 2017158486 A1 | 9/2017 |

OTHER PUBLICATIONS

CA Application # 2,939,664 Office Action dated Apr. 20, 2021.
U.S. Appl. No. 16/085,581 Office Action dated May 7, 2021.
U.S. Appl. No. 16/566,910 Office Action dated Jun. 24, 2021.
Sensomotoric Instruments Gmbh, "SMI Eye Tracking Glasses-Discover What is Seen", pp. 1-2, 2011.
Lensvector, "Breakthrough Autofocus Technology", 1 page, 2010.
Loktev et al., "Wave front control systems based on modal liquid crystal lenses", Review of Scientific Instruments, vol. 71, No. 9, pp. 3290-3297, Sep. 1, 2000.
Pixeloptics Inc., "The Evolution of Technology—emPower!—The world's First Electronic Focusing Eyewear", 1 page, 2009.
Brunosan., "Headaches in 3D", Saepe cadendo, pp. 1-4, Jan. 29, 2011.
Naumov et al., "Liquid-crystal adaptive lenses with modal control", Optics Letters, vol. 23, No. 13, pp. 992-994, Jul. 1, 1998.
Varioptic SA, "Liquid Lens for Auto Focus (AF)", pp. 1-3, Jul. 31, 2012.
Bagwell et al., "Liquid crystal based active optics", SPIE Proceedings Novel Optical Systems Design and Optimization IX, vol. 6289, pp. 1-12, Sep. 5, 2006.
Holoeye Photonics AG, "LC 2002: Translucent Spatial Light Modulator", pp. 1-2, May 12, 2012.
Varioptic SA, "The Liquid Lens Technology", pp. 1-2, Dec. 2, 2010.
Longtech Optics Co Ltd., "LCD Multiplex Ratio", 1 page, year 2008.
Stiefelhagen et al., "A Model-Based Gaze Tracking System", International Journal of Artificial Intelligence Tools, vol. 6, No. 2, pp. 193-209, year 1997.
Baluja et al., "Non-Intrusive Gaze Tracking Using Artificial Neural Networks", CMU Technical Report, CMU-CS-94-102; pp. 1-14, Jan. 5, 1994.
Jacob, R., "The Use of Eye Movements in Human-Computer Interaction Techniques: What You Look at Is What You Get", ACM Transactions on Information Systems, vol. 9, No. 3, pp. 152-169, Apr. 1991.
Heinzmann et al., "3-D Facial Pose And Gaze Point Estimation Using a Robust Real-Time Tracking Paradigm", Proceedings of the Third International Conference on Automatic Face and Gesture Recognition, pp. 142-147, Apr. 14-16, 1998.
Wang et al., "Liquid crystal blazed grating beam deflector", Part of the SPIE Conference on Advanced OpticalMemories and Interfaces to Comouter Storage, San Diego, USA, vol. 3468, pp. 43-54, Jul. 1998.
Goodman, "Introduction to Fourier Optics", 3rd edition, published by Roberts & Company, pp. 1-98, year 2005.
Boulder Nonlinear Systems, "Spatial Light Modulators—XY Phase Series", 1 page, 2007.
Boulder Nonlinear Systems, "Spatial Light Modulators—XY Phase Series—draft Specifications", 1 page, 2007.
Holmarc Opto-Mechantronics Pvt. Ltd., "Lab Equipment for Research and Manufacturing", pp. 1-24 (relevant p. 18 "Bench Top Rubbing Machine"), Jan. 23, 2015.
EP Application # 18869416 Search Report dated Jun. 16, 2021.
International Application # PCT/IB2019/056243 Search Report dated Nov. 3, 2020.
U.S. Appl. No. 16/085,581 Office Action dated Sep. 20, 2021.
EP Application # 21202537.3 Search Report dated Nov. 4, 2021.
U.S. Appl. No. 17/340,138 Office Action dated Feb. 24, 2023.
U.S. Appl. No. 17/521,887 Office Action dated Mar. 23, 2023.
EP Application # 20819033.0 Search Report dated May 17, 2023.
EP Application # 19841482.3 Search Report dated May 13, 2022.
U.S. Appl. No. 16/648,695 Office Action dated Jun. 9, 2022.
International Application # PCT/IB2022/052812 Search Report dated Jun. 30, 2022.
EP Application # 18869416.0 Office Action dated May 26, 2023.
JP Application # 2021568848 Office Action dated Oct. 3, 2023.

\* cited by examiner

TUNABLE LENSES WITH ENHANCED PERFORMANCE FEATURES

CROSS-REFERENCE TO RELATED APPLICATION

This application claims the benefit of U.S. Provisional Patent Application 62/701,857, filed Jul. 23, 2018. This application is a continuation in part of PCT Patent Application PCT/IB2018/054957, filed Jul. 5, 2018, which claims the benefit of U.S. Provisional Patent Application 62/530,306, filed Jul. 10, 2017, and U.S. Provisional Patent Application 62/586,909, filed Nov. 16, 2017. All of these related applications are incorporated herein by reference.

FIELD OF THE INVENTION

The present invention relates generally to optical devices, and particularly to electrically-tunable lenses.

BACKGROUND

Tunable lenses are optical elements whose optical characteristics, such as the focal length and/or the location of the optical axis, can be adjusted during use, typically under electronic control. Such lenses may be used in a wide variety of applications, such as in spectacles for vision correction and for augmented and virtual reality.

Electrically-tunable lenses typically contain a thin layer of a suitable electro-optical material, i.e., a material whose local effective index of refraction changes as a function of the voltage applied across the material. An electrode or array of electrodes is used to apply the desired voltages in order to locally adjust the refractive index to the desired value. Liquid crystals are the electro-optical material that is most commonly used for this purpose (wherein the applied voltage rotates the molecules, which changes the axis of birefringence and thus changes the effective refractive index), but other materials, such as polymer gels, with similar electro-optical properties can alternatively be used for this purpose.

Some tunable lens designs use an electrode array to define a grid of pixels in the liquid crystal, similar to the sort of pixel grid used in liquid-crystal displays. The refractive indices of the individual pixels may be electrically controlled to give a desired phase modulation profile. (The term "phase modulation profile" is used in the present description and in the claims to mean the distribution of the local phase shifts that are applied to light passing through the layer as the result of the locally-variable effective refractive index over the area of the electro-optical layer of the tunable lens, relative to the phase shift that is applied to light passing through the layer when no electrical power is applied.) Lenses using grid arrays of this sort are described, for example, in U.S. Pat. No. 7,475,985.

PCT International Publication WO 2014/049577, whose disclosure is incorporated herein by reference, describes an optical device comprising an electro-optical layer, having an effective local index of refraction at any given location within an active area of the electro-optical layer that is determined by a voltage waveform applied across the electro-optical layer at the location. An array of excitation electrodes, including parallel conductive stripes extending over the active area, is disposed over one or both sides of the electro-optical layer. Control circuitry applies respective control voltage waveforms to the excitation electrodes and is configured to concurrently modify the respective control voltage waveforms applied to excitation electrodes so as to generate a specified phase modulation profile in the electro-optical layer.

PCT International Publication WO 2015/186010, whose disclosure is incorporated herein by reference, describes adaptive spectacles, which include a spectacle frame and first and second electrically-tunable lenses, mounted in the spectacle frame. In one embodiment, control circuitry is configured to receive an input indicative of a distance from an eye of a person wearing the spectacles to an object viewed by the person, and to tune the first and second lenses in response to the input. Other types of electrically tunable lenses and aspects of their operation are described in PCT International Publication WO 2017/216716, whose disclosure is likewise incorporated herein by reference.

In some applications, such as in adaptive spectacles, it is desirable that an electrically-tunable lens be capable of rapid switching of its phase modulation profile, for example in response to movements and changes in focal distance of the eye. In this regard, PCT International Publication WO 2017/182906 describes the application of overshoot and undershoot voltages in switching between different sets of control voltage waveforms, corresponding to two different focal powers. The higher voltage differences promote faster switching of the phase modulation profile in the liquid crystal in the lens.

As noted earlier, electronically-tunable lenses may be used in augmented and virtual reality applications. Virtual reality systems show a user a virtual scene, typically using a near-eye display with collimating optics to enable sharp vision from a close distance. Augmented reality systems show a user virtual content over a real-world scene, typically using a transparent (or semi-transparent) light guide that enables viewing of the real world through it, and projects the virtual content into the user's eyes.

U.S. Pat. No. 9,304,319, for example, describes an augmented reality system with a see-through display device that includes a variable focus lens a user looks through. A focal region adjustment unit automatically focuses the variable focus lens in a current user focal region. A microdisplay assembly attached to the see-through display device generates a virtual object for display in the user's current focal region by adjusting its focal region.

SUMMARY

Embodiments of the present invention that are described hereinbelow provide improved electrically-tunable optical devices, as well as systems based on such devices and methods for their control.

There is therefore provided, in accordance with an embodiment of the invention, optical apparatus, including a transparent envelope and an electro-optical layer, contained within the envelope and having an effective local index of refraction at any given location that is determined by a voltage waveform applied across the electro-optical layer at the location. An array of excitation electrodes is disposed over a surface of the transparent envelope. Control circuitry is configured to apply voltage waveforms to the excitation electrodes so as to generate across at least a part of the active area of the electro-optical layer a phase modulation profile including spatially alternating peaks and troughs separated by phase transitions chosen so as to emulate a Fresnel lens, while the troughs have respective phase modulation depths that vary by at least one quarter wavelength at a nominal wavelength of 500 nm across at least the part of the active area of the electro-optical layer that emulates the Fresnel lens.

In a disclosed embodiment, the respective phase modulation depths of the troughs vary by at least one half wavelength at the nominal wavelength across the part of the active area of the electro-optical layer that emulates the Fresnel lens. In another embodiment, the phase transitions have respective amplitudes that increase monotonically from a central zone of the Fresnel lens outward toward a periphery of the part of the active area of the electro-optical layer that emulates the Fresnel lens.

In some embodiments, the phase modulation depths at the troughs in at least a central zone of the Fresnel lens are at least four wavelengths of light at the nominal wavelength.

Additionally or alternatively, the peaks have respective peak phase modulations that vary across the part of the active area of the electro-optical layer that emulates the Fresnel lens by at least one quarter wavelength at the nominal wavelength.

Further additionally or alternatively, the array of excitation electrodes has an average pitch, and the peaks in the phase modulation profile are spaced apart by integer multiples of a value that is at least three times the average pitch.

In some embodiments, the excitation electrodes include parallel conductive stripes extending across a first surface of the transparent envelope, and the apparatus includes a transparent common electrode on a second surface of the transparent envelope, opposite the first surface, and wherein the control circuitry is configured to apply the voltage waveforms to the excitation electrodes so that the phase modulation profile emulates a cylindrical Fresnel lens.

Typically, the control circuitry is configured to modify the voltage waveforms so as to change a focal power of the Fresnel lens and/or to shift and optical center of the Fresnel lens emulated by the phase modulation profile. In some embodiments, the control circuitry is configured to apply the voltage waveforms so that outside the part of the active area that is in proximity to the optical center of the Fresnel lens, the electro-optical layer applies a constant phase modulation to light that is incident on the apparatus.

In a disclosed embodiment, the electro-optical layer includes a liquid crystal.

There is also provided, in accordance with an embodiment of the invention, an augmented reality (AR) system, including an AR display configured to project an image with a given linear polarization toward an eye of a viewer while allowing the viewer to view a scene through the display. An electrically-tunable lens, including an optical phase modulator configured to focus light only of the given linear polarization, is positioned between the display and the eye. A controller is coupled to identify a location of an item of interest in the projected image, and to drive the optical phase modulator to apply a refractive correction within an area of the electrically-tunable lens surrounding an axis running from the eye to the identified location, while applying no refractive correction by the optical phase modulator outside the area.

In a disclosed embodiment, there is no polarizer interposed between the scene and the eye and no further electrically-tunable lens interposed between the scene and the AR display.

In some embodiments, the controller is configured to adjust the refractive correction responsively to a virtual distance to the location of the item of interest in the image that is projected toward the eye. Additionally or alternatively, the controller is configured to identify a change in the location or in the item of interest, and to shift the area within which the refractive correction is applied responsively to the identified change.

In a disclosed embodiment, the system includes an eye tracker, which is configured to identify a direction of gaze of the eye, wherein the controller is configured to identify the location of the item of interest responsively to the direction of gaze.

Typically, the area over which the refractive correction is applied by the optical phase modulator has an angular width, relative to the eye, that is no greater than 20°, or even no greater than 5°.

Additionally or alternatively, the area over which the refractive correction is applied defines a viewing aperture of the electrically-tunable lens, and the controller is configured to drive the display to blur a part of the image that is projected outside the viewing aperture.

There is additionally provided, in accordance with an embodiment of the invention, a method for optical correction, which includes providing an electro-optical modulator including a transparent envelope containing an electro-optical layer having an effective local index of refraction at any given location that is determined by a voltage waveform applied across the electro-optical layer at the location, with an array of excitation electrodes disposed over a surface of the transparent envelope. Voltage waveforms are applied to the excitation electrodes so as to generate across at least a part of the active area of the electro-optical layer a phase modulation profile including spatially alternating peaks and troughs separated by phase transitions chosen so as to emulate a Fresnel lens, while the troughs have respective phase modulation depths that vary by at least one quarter wavelength at a nominal wavelength of 500 nm across at least the part of the active area of the electro-optical layer that emulates the Fresnel lens.

There is further provided, in accordance with an embodiment of the invention, a method for vision correction, which includes projecting an image with a given linear polarization from an augmented reality (AR) display toward an eye of a viewer while allowing the viewer to view a scene through the display. An electrically-tunable lens, including an optical phase modulator configured to focus light only of the given linear polarization, is positioned between the display and the eye. A location of an item of interest in the projected image is identified, and the optical phase modulator is driven to apply a refractive correction within an area of the electrically-tunable lens surrounding an axis running from the eye to the identified location, while applying no refractive correction by the optical phase modulator outside the area.

There is moreover provided, in accordance with an embodiment of the invention, optical apparatus, including a transparent envelope and an electro-optical layer, contained within the envelope and having an effective local index of refraction at any given location that is determined by a voltage waveform applied across the electro-optical layer at the location, having an available dynamic phase modulation range determined by a thickness and a range of effective local index of refraction of the electro-optical layer. An array of excitation electrodes is disposed over a surface of the transparent envelope. Control circuitry is configured to apply voltage waveforms to the excitation electrodes so as to generate across at least a part of the active area of the electro-optical layer a phase modulation profile including spatially alternating peaks and troughs separated by phase transitions chosen so as to emulate a Fresnel lens, while applying a phase modulation over at least 90% of the part of the active area emulating the Fresnel lens that is less than 70% of the available dynamic phase modulation range of the electro-optical layer.

In some embodiments, the phase modulation applied over at least 90% of the part of the active area emulating the Fresnel lens is less than 50% of the dynamic phase modulation range of the electro-optical layer.

Additionally or alternatively, the voltage waveforms are chosen so that an unused lower part of the available dynamic phase modulation range below the troughs has an extent that is larger than an unused upper part of the available dynamic phase modulation range above the peaks. In some embodiments, the extent of the unused lower part of the available dynamic phase modulation range below the troughs is larger than twice the unused upper part of the available dynamic phase modulation range above the peaks.

There is furthermore provided, in accordance with an embodiment of the invention, a method for optical correction, which includes providing an electro-optical modulator including a transparent envelope containing an electro-optical layer having an effective local index of refraction at any given location that is determined by a voltage waveform applied across the electro-optical layer at the location, with an array of excitation electrodes disposed over a surface of the transparent envelope, the electro-optical modulator having an available dynamic phase modulation range determined by a thickness and a range of effective local index of refraction of the electro-optical layer. Voltage waveforms are applied to the excitation electrodes so as to generate across at least a part of the active area of the electro-optical layer a phase modulation profile including spatially alternating peaks and troughs separated by phase transitions chosen so as to emulate a Fresnel lens, while applying a phase modulation over at least 90% of the part of the active area emulating the Fresnel lens that is less than 70% of the available dynamic phase modulation range of the electro-optical layer.

The present invention will be more fully understood from the following detailed description of the embodiments thereof, taken together with the drawings in which:

DETAILED DESCRIPTION OF EMBODIMENTS

Overview

Figure 1A:
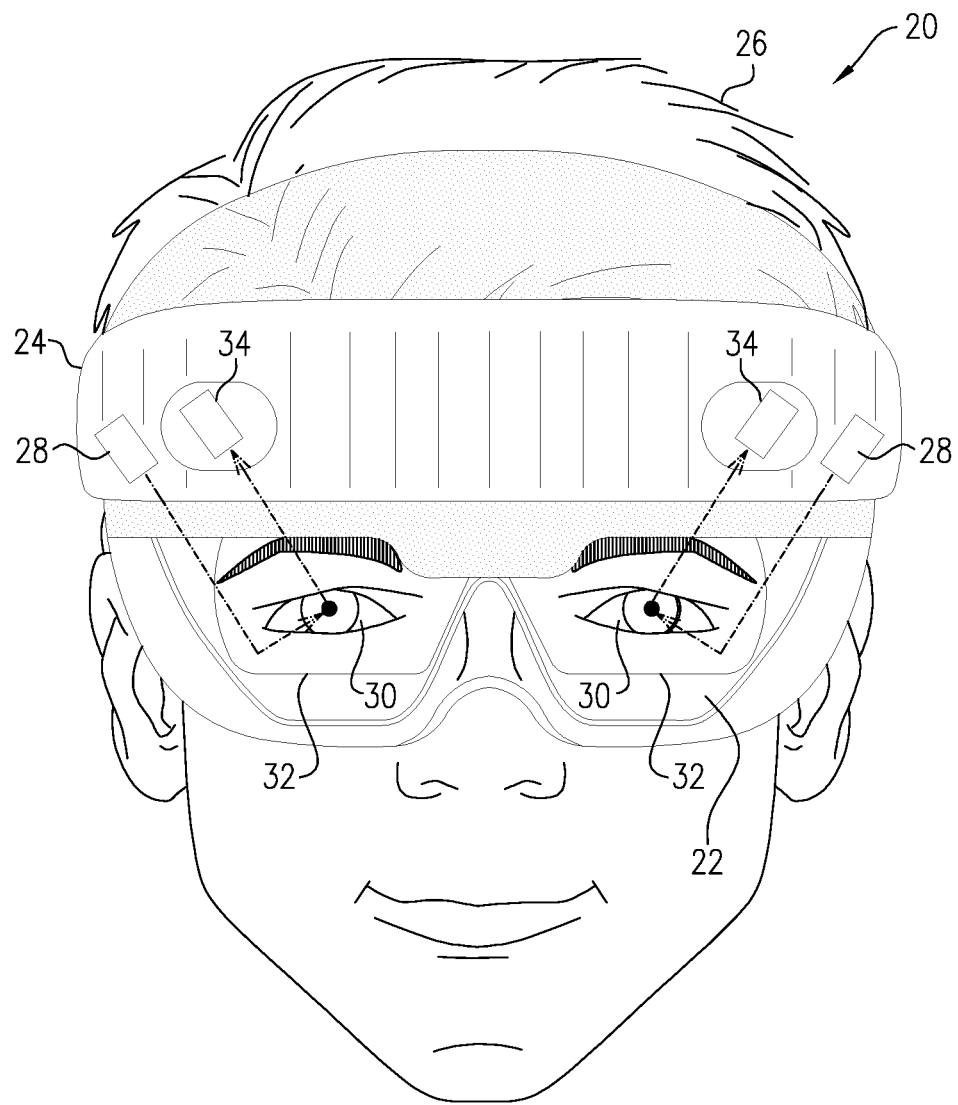
FIGS. 1A and 1B are schematic front and sectional views, respectively, of an augmented reality system that incorporates electrically-tunable lenses, in accordance with an embodiment of the invention.

Tunable lenses offer major advantages over conventional static lenses in ophthalmic use. For example, tunable spectacle lenses can dynamically adjust their focal lengths for different object distances, as an aid to individuals who have lost their natural ability to accommodate for distance due to presbyopia or aphakia. Tunable spectacle lenses can also adjust their optical power to compensate for eye fatigue and different lighting conditions and can even be shared by different people with different prescriptions. The above-mentioned PCT International Publications WO 2014/049577 and WO 2015/186010, for example, describe technological means that can be applied in producing such lenses and in controlling their focal properties.

The above-mentioned PCT Patent Application PCT/IB2018/054957 (published as WO 2019/012385) describes the use of electrically-tunable lenses for dynamic vision correction, particularly in virtual reality and augmented reality systems. In these augmented reality (AR) systems, one or more electrically-tunable lenses are positioned in line with an AR projection display. A controller receives information on the direction and the distance to an item of interest projected by the AR system (based on the virtual content, eye tracking information or other methods), as well as information on the distance-accommodation capability of the viewer's eyes. Based on this information, the controller sets and varies the refractive power and optical center of the dynamic lens or lenses. The viewer is thus able to view comfortably both the projected AR display and the real-world scene on which it is superimposed, with minimal eye strain.

Electrically-tunable lenses that use a liquid crystal (LC) as their electro-optical medium are generally polarization-dependent, meaning that the lens will refract light of one linear polarization but will have no effect on the orthogonal polarization. PCT/IB2018/054957 describes various solutions to this limitation, such as using a pair of electrically-tunable lenses with orthogonal polarizations, or using a polarizer with the same polarization as the electrically-tunable lens, in line with the display, to filter out light of the orthogonal polarization. As still another alternative, a pair of electrically-tunable lenses with the same polarization and complementary refractive powers may be used, with one lens between the display and the eye and the other lens between the display and the real-world scene that is viewed through the display.

These solutions, although effective, can be cumbersome, since they require multiple optical elements and may reduce the amount of light reaching the viewer's eye. Some embodiments of the present invention address this problem by providing an AR system that requires only a single electrically-tunable lens, without a polarizer, to facilitate optical accommodation by the viewer. In these embodiments, an AR display projects an image with a given linear polarization toward the eye of a viewer while allowing the viewer to view a scene through the display. An electrically-tunable lens configured to focus light only of the same linear polarization as the display is positioned between the display and the eye. (In a binocular AR system, electrically-tunable lenses of this sort can be placed in front of both eyes.)

A controller identifies the location of an item of interest in the projected image and thus defines an axis running from the eye to this location. The controller then drives the electrically-tunable lens to apply a refractive correction within an area of the electrically-tunable lens surrounding this axis, while applying no refractive correction outside the area. The area over which the refractive correction is applied is typically narrow, and thus defines a viewing aperture with a narrow angular width relative to the field of view of the eye, for example no greater than 20°, or even less, for example only in the foveal are of vision, which is typically no more than 5° wide. Therefore, the item of interest will appear to the viewer to be in focus, while light passing through the display and lens outside the area of the item will be unaffected by the refractive correction, regardless of polarization.

When the refractive correction is applied over only a small part of the area of the electrically-tunable lens, however, optical artifacts can occur in the region of transition between the refracting and non-refracting areas of the lens. PCT/IB2018/054957 describes waveforms that can be applied to the excitation electrodes in the transition region in order to provide a gradual transition of optical power and suppress these artifacts. Parts of the AR display that fall within these transition regions, however, may appear to the viewer to be distorted and thus cause visual distraction to the viewer. To mitigate this sort of distortion, in some embodiments the controller drives the display to blur parts of the AR image that are projected outside the viewing aperture of the electrically-tunable lens. Because these areas are, in any case, outside the viewer's area of sharp foveal vision, the viewer will not be aware that they are blurred.

When there are changes in the virtual distance and the direction to the location of the item of interest in the AR display, the controller in the AR system detects these changes and adjusts the area of refractive correction accordingly. (The detection may be based on eye tracking, for example, and/or on the content of the image projected by the AR display.) It is highly desirable for this purpose that the electrically-tunable lens be capable of changing its phase modulation profile rapidly (as noted in the above-mentioned PCT International Publication WO 2017/182906).

This sort of fast response can be facilitated by using a thin liquid crystal layer as the electro-optical layer. Using a thin liquid crystal layer, however, limits the dynamic range of the phase modulation that can be achieved by the lens. (The dynamic phase modulation range, or equivalently, the phase modulation depth, expressed in wavelengths of light at a nominal wavelength, such as 500 nm, is proportional to the birefringence and the thickness of the liquid crystal.) Under these circumstances, the control circuitry of the electrically-tunable lens may advantageously drive the electro-optical medium to emulate a Fresnel lens, taking greater advantage of the limited modulation range. For this purpose, the control circuitry applies voltage waveforms to the excitation electrodes so as to generate, across at least a part of the active area of the electro-optical layer (i.e., the area excited by the electrodes), a phase modulation profile comprising spatially alternating peaks and troughs separated by phase transitions of appropriate amplitudes.

To accelerate changes in the phase modulation profile when they are required, it is further desirable that the control circuitry apply the voltage waveforms to the excitation electrodes in a narrow range of relatively high voltages. As a result, in the embodiments described below, the minimum voltages of the waveforms are sufficiently high, at least in the central zone of the Fresnel lens, so that even in the troughs, the electro-optical layer gives rise to a substantial phase modulation, relative to the dynamic range of phase modulation. As a result, for example, the phase modulation applied over at least 90% of the active area of the Fresnel lens may be less than 70% of the available dynamic phase modulation range of the electro-optical layer, or even less than 50% of the available dynamic phase modulation range. Because of these limitations, the phase transitions in the phase modulation profile of the Fresnel lens may be only one or two wavelengths, while the phase modulation depth in the troughs is at least four wavelengths.

This small range of the phase transitions can give rise to optical artifacts due to the high density of peaks and troughs across the area of the electro-optical layer. To overcome these difficulties, in some embodiments of the present invention, the control circuitry of the electrically-tunable lens applies waveforms of different voltages to the excitation electrodes, so that at least the respective phase modulation depths of the troughs vary by at least one quarter wavelength, and possibly one half wavelength or more, at a nominal wavelength of 500 nm across at least the part of the active area of the electro-optical layer that emulates the Fresnel lens. Additionally or alternatively, the peak modulation depths may vary in a similar fashion.

This arrangement enables operation of the electrically-tunable lens as a Fresnel lens with both good optical quality and fast response, for example when changes are needed in the focal power or optical center of the Fresnel lens. Furthermore, the locations of the peaks and troughs can be designed so that the distances between the peaks are integer multiples of a given minimal distance, so that when the lens is shifted laterally by multiples of the minimal distance, the locations of the peaks and troughs do not change much. This minimal distance may advantageously be at least three times the average pitch of the array of excitation electrodes that is used to create the phase modulation profile.

Although the features of such electrically-tunable lenses are described herein, for the sake of concreteness and clarity of illustration, mainly in the context of AR systems, these sorts of lenses may alternatively be used as generic spectacle lenses, as well as in other optical applications. Conversely, although the AR systems described hereinbelow specifically use this sort of electrically-tunable Fresnel lenses, the principles of the present invention may alternatively be implemented using electrically-tunable lenses of other types.

AR System With Electrically-Tunable Lenses

Figure 1B:
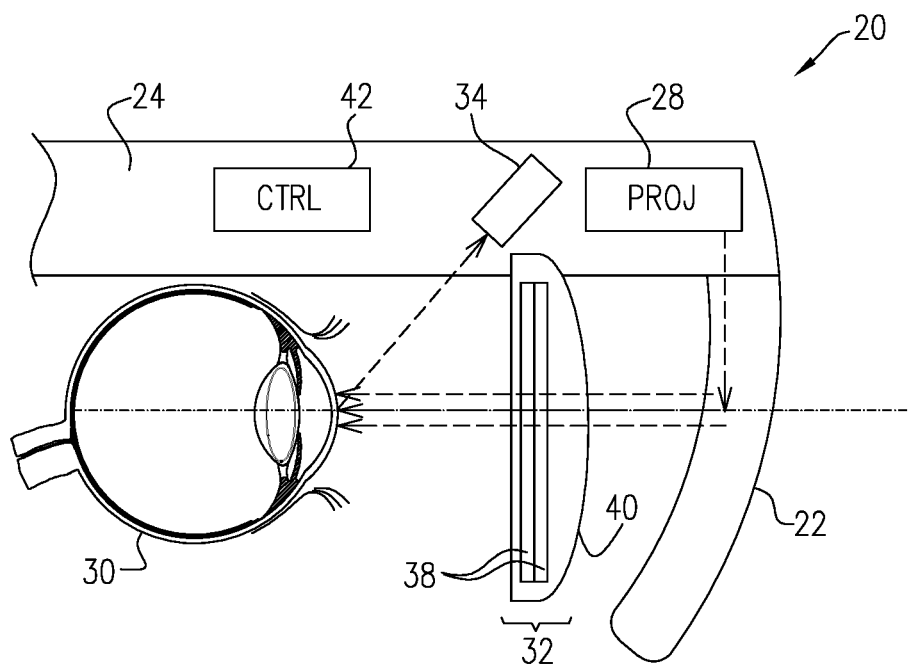

FIGS. 1A and 1B are schematic front and sectional views, respectively, of an AR system 20 that incorporates electrically-tunable lenses 32, in accordance with an embodiment of the invention. System 20 comprises an AR display 22, which projects AR images toward one or both eyes 30 of a viewer 26, while allowing the viewer to view a scene through the display. In the pictured example, display 22 is mounted on a frame 24, which contains or otherwise supports one or more miniature image projectors 28 (typically one for each eye). Each projector 28 projects images of a given linear polarization toward display 22, which reflects the image beams toward eyes 30 without changing the polarization. (Alternatively or additionally, display 22 may have a polarizing effect.)

Display 22, typically comprises a transparent waveguide, into which the image projected by projector 28 is coupled by suitable optics. The surface of the waveguide facing viewer 26 comprises a structure, such as a hologram, a diffraction grating, or a beamsplitter with partially reflecting facets, to deflect the image toward the viewer. Displays of this sort include, for example, HoloLens, available from Microsoft Corporation (Redmond, Washington), and the DK-Vision development kit available from Lumus (Ness Ziona, Israel).

Figure 2:
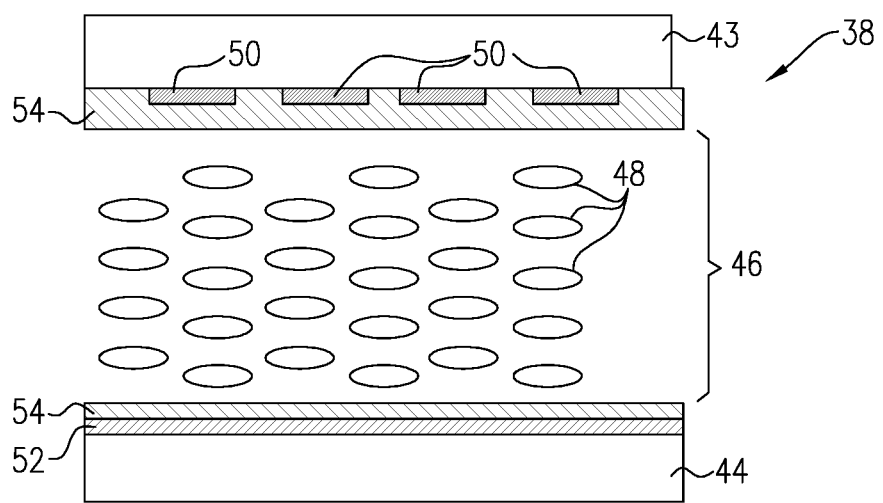
FIG. 2 is a schematic sectional view of an electrically-tunable optical phase modulator, in accordance with an embodiment of the invention.

Electrically-tunable lenses 32 are positioned between display 22 and eyes 30. As shown in FIG. 1B, lenses 32 may comprise compound lenses, including a static lens 40 and one or more optical phase modulators 38, which are chosen and configured to provide the corrections necessary for the ocular refraction and accommodation capabilities of viewer 26. Optical phase modulators 38, which are described in greater detail hereinbelow with reference to FIG. 2, are configured to focus light of the same linear polarization as is projected by projector 28. Details of the design and operation of such lenses are described in the above-mentioned PCT Patent Application PCT/IB2018/054957. In the present embodiment, however, in system 20 there is no polarizer interposed between the eyes 30 and the scene that can be viewed through display 22, nor is there any further electrically-tunable lens interposed between display 22 and the scene.

A controller 42 identifies the location of an item of interest in the projected image and drives optical phase modulators 38 in lenses 32 to apply an appropriate refractive correction, but only within an area of each lens surrounding an axis running from the eye to the identified location. Typically, the optical phase modulators apply no refractive correction outside the area (although static lens 40 may apply a fixed refractive correction over the entire field of view). The refractive correction applied by optical phase modulators 38 is chosen so as to adjust for the virtual distance from eyes 30 to the location of the identified item of interest. When controller 42 identifies a change in the location of the current item of interest, or a change in the item of interest itself (for example, because the viewer's attention has shifted to a different item in the display), controller 42 will drive optical phase modulators 38 to shift the areas within which they apply a refractive correction in response to the identified change. Further details of the operation of controller 42 and lenses 32 in applying these refractive corrections are described hereinbelow with reference to FIG. 6.

Controller 42 may identify the direction to the item of interest, as well as the accommodation distance, based on a variety of possible inputs. In the pictured embodiment, for example, one or more eye trackers 34 built into or supported by frame 24 may detect the gaze angles of eyes 30. Controller 42 may then identify the location of the item of interest and the area in which to apply the refractive correction on this basis. The gaze angles of the two eyes may differ in viewing nearby objects, and controller 42 may detect and apply the convergence of the gaze angles in determining and accommodating for the distance at which eyes 30 are attempting to focus. Alternatively or additionally, controller 42 may receive an input, for example from projector 28, indicating the location of an item of interest in the images projected by display 22 and may use this information independently or in conjunction with the gaze angles indicated by eye trackers 34.

Controller 42 typically comprises a programmable processor, which is programmed in software and/or firmware to carry out the functions that are described herein. Alternatively or additionally, controller 42 comprises hard-wired and/or programmable hardware logic circuits, which carry out at least some of the functions of the controller. Although controller 42 is shown in the figures, for the sake of simplicity, as a single, monolithic functional block, in practice the controller may comprise a single chip or a set of two or more chips, with suitable interfaces for receiving and outputting the signals that are illustrated in the figures and are described in the text.

FIG. 2 is a schematic sectional view of optical phase modulator 38, in accordance with an embodiment of the invention. Optical phase modulator 38 comprises an electro-optical layer 46, contained in an envelope comprising an upper substrate 43 and a lower substrate 44, which comprise a transparent material, for example, glass. Layer 46 comprises a liquid crystal material, which is typically contained by suitable encapsulation, as is known in the art. Substrates 43 and 44 can be coated on their insides with a polyimide alignment layer 54 (for example PI-2555, produced by Nissan Chemical Industries Ltd., Japan), which contains linear alignment structures in contact with layer 46, which cause liquid crystal molecules 48 to line up in a desired parallel orientation. The linear alignment structures can comprise actual physical grooves in alignment layer 54, for example, or alternatively molecular structures in the alignment layer that exert electrical aligning forces on the liquid crystal molecules.

Conductive electrodes 50 and 52 are disposed over opposing first and second sides of electro-optical layer 46. Electrodes 50 and 52 comprise a transparent, conductive material, such as indium tin oxide (ITO), as is known in the art, which is deposited on the surfaces of substrates 43 and 44, respectively. (Alternatively, non-transparent excitation electrodes may be used, as long as they are thin enough so that they do not cause disturbing optical effects.) Although for the sake of visual clarity, only a few electrodes are shown in FIG. 2, in practice, for good optical quality, optical phase modulator 38 will typically comprise at least 100 stripe electrodes for excitation, and possibly even 400 or more.

Electrodes 50 in the pictured embodiment are arranged as an array of parallel stripes. On the opposite side of layer 46, electrodes 52 may comprise stripes perpendicular to electrodes 50, which enable control circuitry (such as controller 42, together with suitable analog drive circuits) to apply two-dimensional voltage patterns across layer 46. Alternatively, electrode 52 may comprise a uniform layer on substrate 44, defining a common electrode capable of serving as an electrical ground plane. In this latter case, only one-dimensional voltage patterns can be applied across layer 46, which can be used to create phase modulation profiles that emulate cylindrical lenses (such as a cylindrical Fresnel lens in the embodiments of FIGS. 3A-C, 4A-C and 5). As shown in FIG. 1B, two such optical phase modulators 38 in series, with electrodes 50 oriented orthogonally one to the other, can be used in lens 32 to generate two-dimensional optical modulation patterns. Both optical phase modulators in this case are configured to focus light of the same linear polarization.

Due to the behavior of liquid crystal molecules 48, electro-optical layer 46 has an effective local index of refraction at any given location within the active area of the layer that is determined by the voltage waveform that is applied across the electro-optical layer at that location. Controller 42 applies the appropriate control voltage waveforms to electrodes 50 and 52 so as to modify the optical phase modulation profile of electro-optical layer 46. When used in spectacles, such as in lens 32, the phase modulation profile is chosen to cause rays of optical radiation that are incident on optical phase modulator 40 to converge or diverge with a desired focal power. For strong focal power, the phase modulation profile may comprise a Fresnel profile, with sharp peaks and troughs alternating spatially across at least a part of the active area of electro-optical layer 46. Alternatively or additionally, the control voltage waveforms may be chosen so as to give rise to a smooth refractive phase modulation profile.

Further details of a variety of electrode structures that can be used in electrically-tunable lenses, as well as the control voltage waveforms that may be applied to such electrodes in order to generate various sorts of phase modulation profiles, are described in the above-mentioned WO 2014/049577 and WO 2015/186010. These details are omitted here for the sake of brevity.

Emulation of Fresnel Lenses

Figure 3A:
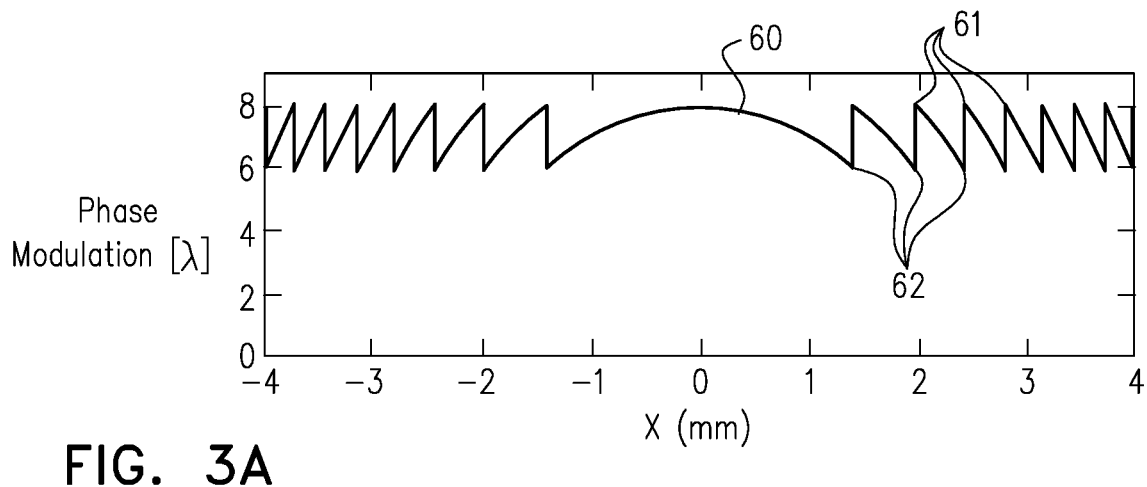
FIGS. 3A, 3B and 3C are plots that schematically illustrate phase modulation profiles applied by an electrically-tunable lens, in accordance with an embodiment of the invention.
Figure 3B:
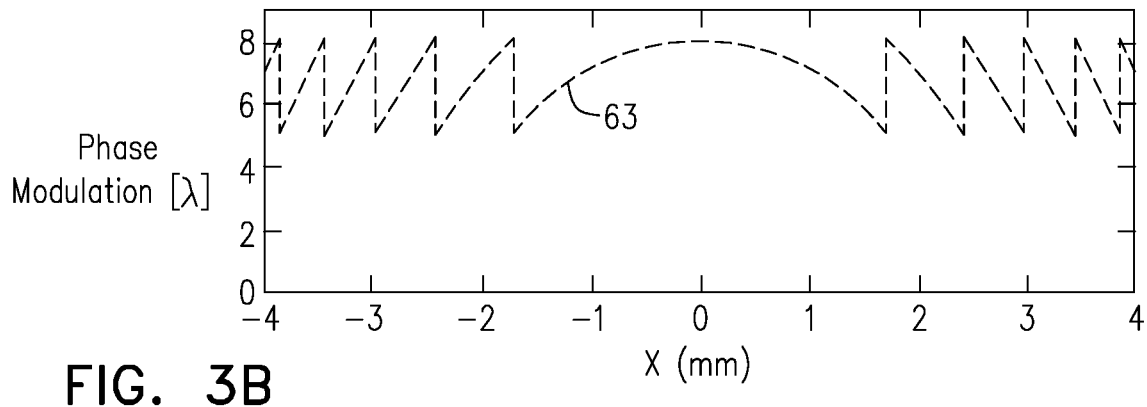
Figure 3C:
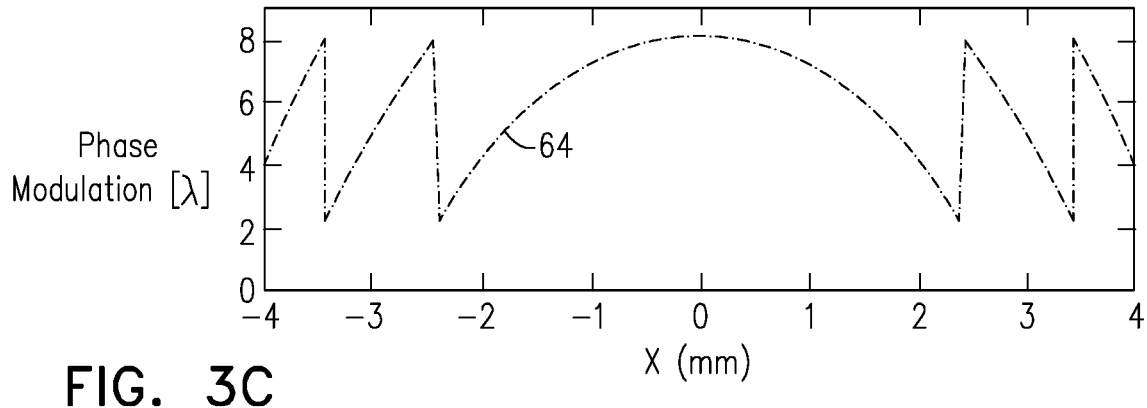

FIGS. 3A, 3B and 3C are plots that schematically illustrate Fresnel-type phase modulation profiles 60, 63 and 64, respectively, that are applied by an electrically-tunable lens, in accordance with an embodiment of the invention. Profiles 60, 63 and 64 may be applied, for example, by optical phase modulator 38, as shown and described above. The plots show the phase modulation of light at a nominal wavelength, for example $\lambda=500$ nm, as a function of distance X (in mm) from the optical center of the phase modulation pattern. (These plots and the subsequent plots show the absolute value of phase modulation; in general, in liquid crystal materials, the local refractive index, and hence the phase modulation, can either increase or decrease with increasing applied voltage, relative to the refractive index with no voltage applied, depending on the material type.) As noted earlier, controller 42 may modify the voltage waveforms applied to electrodes 50 so as to change the focal power and to shift the optical center of the lens.

Profiles 60, 63 and 64 are chosen so as to emulate a Fresnel lens, meaning that they comprise spatially alternating peaks 61 and troughs 62 of phase modulation, separated by phase transitions, which emulate the thickness variations of a conventional Fresnel lens. The phase modulation refers to the phase retardation of light at the nominal wavelength passing through the electro-optical layer when voltage is applied, relative to the phase retardation of light passing through the layer when zero voltage is applied. In this example the maximal modulation of the electro-active layer (when maximal voltage is applied) is nine wavelengths. In all of profiles 60, 63 and 64, the driving voltages are chosen so that only a part of the dynamic range of phase modulation is used. For example, profile 60 uses a range of 6-8 wavelengths; profile 63 uses a range of 5-8 wavelengths; and profile 64 uses a range of 2-8 wavelengths. In these example, the phase modulation applied by electro-optical layer 46 is less than 70% of the available dynamic phase modulation range of the electro-optical layer over at least 90% of the part of the active area emulating the Fresnel lens; and in profiles 60 and 62 the phase modulation applied by electro-optical layer 46 is less than 50% of the available dynamic phase modulation range of the electro-optical layer over at least 90% of the part of the active area emulating the Fresnel lens.

Reducing the range of modulation results in more Fresnel phase discontinuities. Switching between different phase modulation values within a smaller range, however, results in faster response times, especially if this range consists of relatively high voltages as in the examples shown in FIGS. 3A-C. Therefore it is beneficial to use less than 70% of the available dynamic phase modulation range of the phase modulator, or even less than 50%, as shown in the present examples. The upper limit of the plots shown in FIGS. 3A-C represents the maximal phase modulation that can be provide by a liquid crystal layer of the given thickness, when driven at the maximal useful voltage. (Above this voltage level, no increase in phase modulation is achieved.) The figures thus show low and high unused modulation ranges that correspond respectively to driving voltages lower than the minimal voltage at troughs 62 and higher than the maximal voltage that is used in driving the excitation electrodes at peaks 61 to achieve the desired phase modulation profiles. As illustrated by plots 60, 63 and 64, it is beneficial that the extent of the low unused phase modulation range be larger than that of the high unused modulation range, or even more than twice the extent. For example, the extent of the unused low range in FIG. 3A is six wavelengths, while the extent of the high unused range is one wavelength.

Figure 4A:
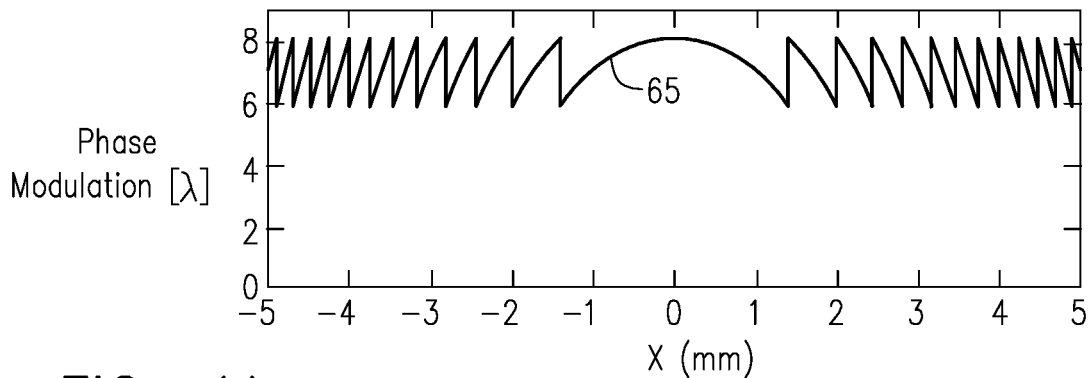
FIGS. 4A, 4B and 4C are plots that schematically illustrate phase modulation profiles applied by an electrically-tunable lens, in accordance with another embodiment of the invention.
Figure 4B:
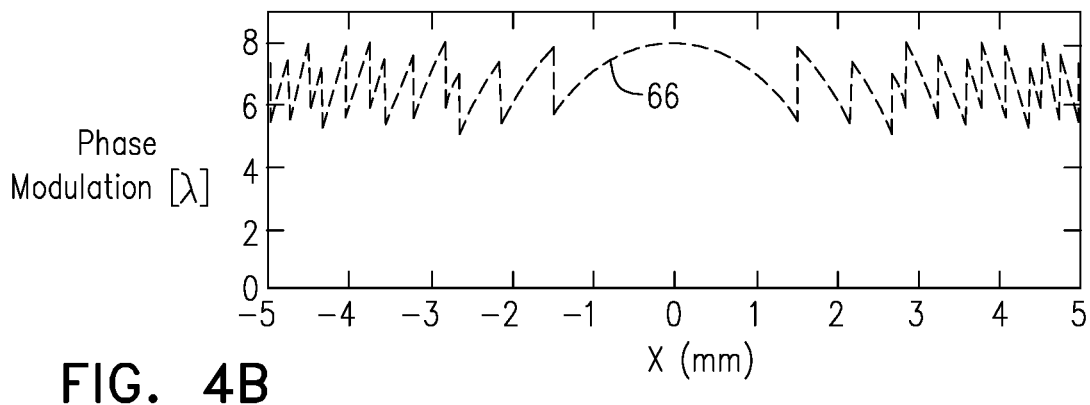
Figure 4C:
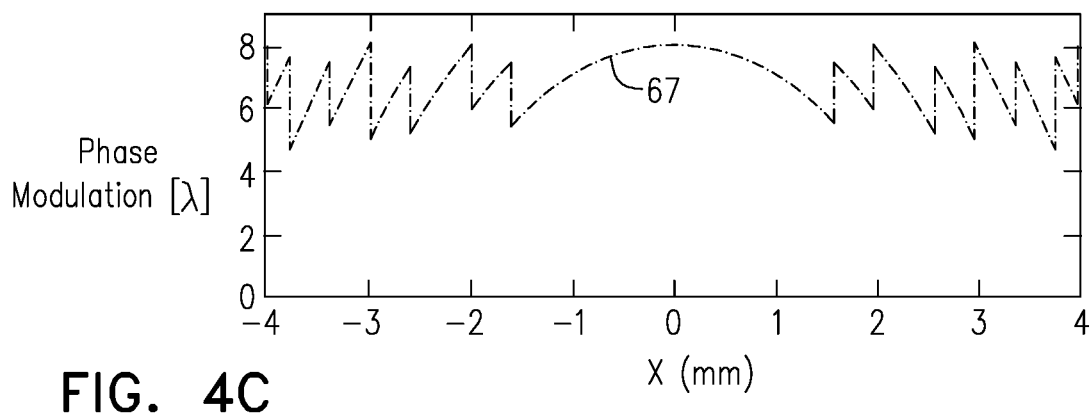

FIGS. 4A, 4B and 4C are plots that schematically illustrate phase modulation profiles 65, 66 and 67 applied by an electrically-tunable lens, in accordance with another embodiment of the invention. These profiles may be generated and modified in a similar fashion to the profiles shown in FIGS. 3A-3C. In these examples (as well as those shown in FIGS. 3A and 3B), the troughs in at least the central zone of the Fresnel lens give rise to a phase modulation of at least four wavelengths, although the troughs may alternatively have larger or smaller modulation depths (for example as shown in FIG. 3C). The phase transition between each peak and the succeeding trough in profiles 65 and 66 is two wavelengths. This sort of behavior can be achieved, for example, by using a liquid crystal in layer 46 with a thickness of 25 μm and birefringence of $\Delta n=0.18$, and applying electrode voltages ranging between 2.7 V and 3.9 V. Alternatively, liquid crystals with other ranges of layer thickness and refractive characteristics may be used (with appropriate adjustment of the driving voltages), as well as other types of electro-optical materials.

Because the phase transitions in profile 65 are all of equal amplitude, optical artifacts could arise due to consistent inaccuracies in the implementation of the phase modulation profile by the electrically-tunable lens. One way of overcoming these artifacts is to vary the phase modulation depths of the troughs, and possible the peaks, as well, as illustrated by profile 66. For example, in profile 66, the depth of phase modulation at the troughs (as well as the peaks) varies across the part of the active area of the electro-optical layer that emulates the Fresnel lens by at least one quarter wavelength of light at a wavelength of 500 nm, or even a half wavelength or more.

In plot 67, shown in FIG. 4C, as in plot 66, each segment of the Fresnel profile uses a different range of phase modulation. In this example the voltage waveforms are chosen such that the distances between the peaks are integer multiples of a given minimal distance, 200 μm in this example. When the lens is shifted laterally in multiples of this distance, i.e., in steps of 200 μm in the present example, more peaks and troughs remain at the same locations compared to implementation that do not use this feature. It can therefore be advantageous to limit shifts of the Fresnel profile to such steps. As a result, the lens can be shifted more smoothly.

Figure 5:
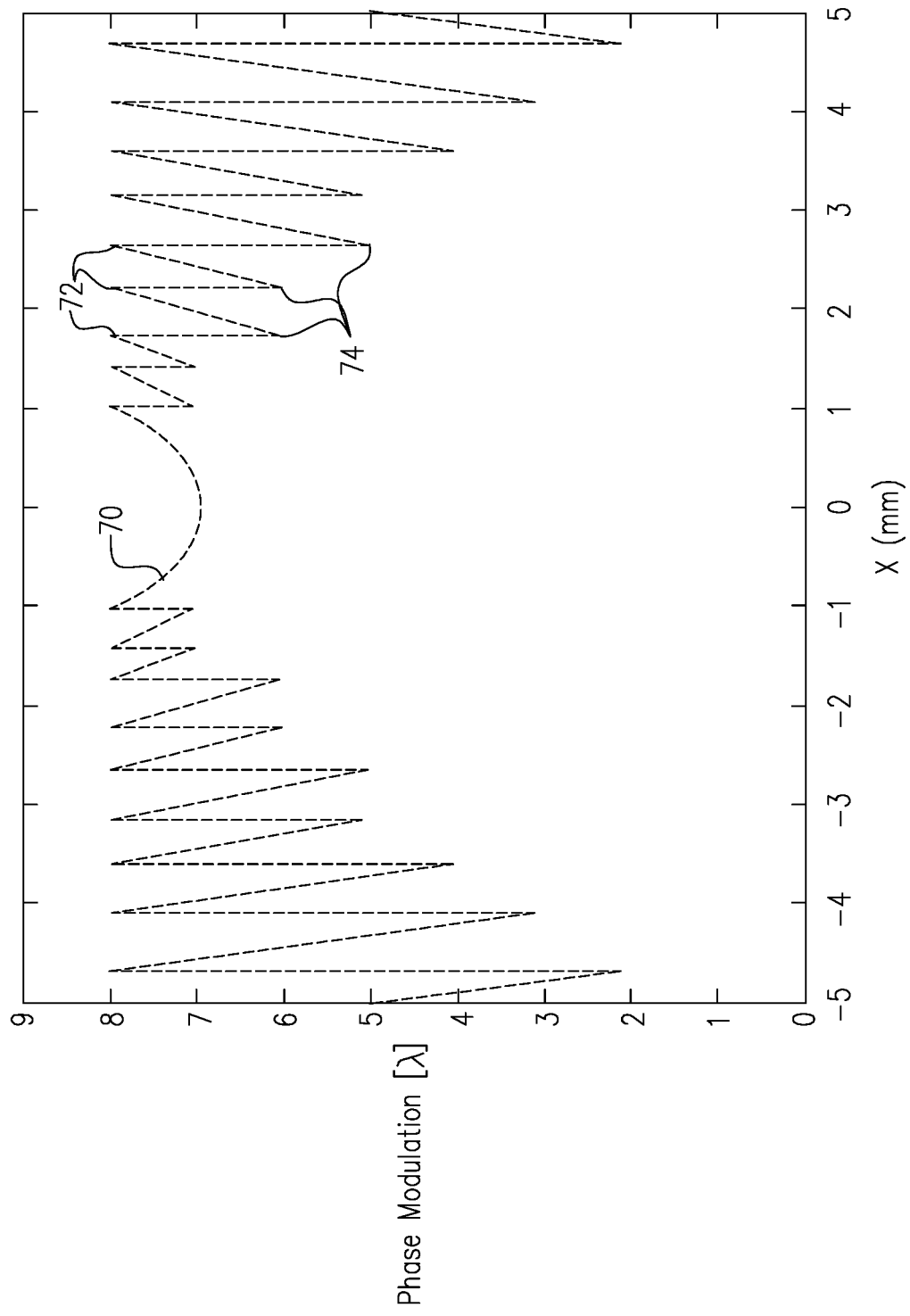
FIG. 5 is a plot that schematically illustrate a phase modulation profile applied by an electrically-tunable lens, in accordance with another embodiment of the invention.

FIG. 5 is a plot that schematically illustrates a phase modulation profile 70 applied by an electrically-tunable lens, such as by optical phase modulator 38, in accordance with another embodiment of the invention. In this case, controller 42 applies the voltage waveforms to electrodes 50 so that the respective amplitudes of the phase transitions between peaks 72 and successive troughs 74 increase monotonically from the central zone of the Fresnel lens outward toward the periphery of the lens area. The use of relatively high voltages in the central region of the lens facilitates rapid adjustment of the lens power, as in the preceding embodiment. At the same time, the larger phase transitions in the peripheral area of the lens spread the peaks and troughs farther apart, and thus improve the optical quality of the lens.

Matching Focal Area to Displayed Items

Figure 6:
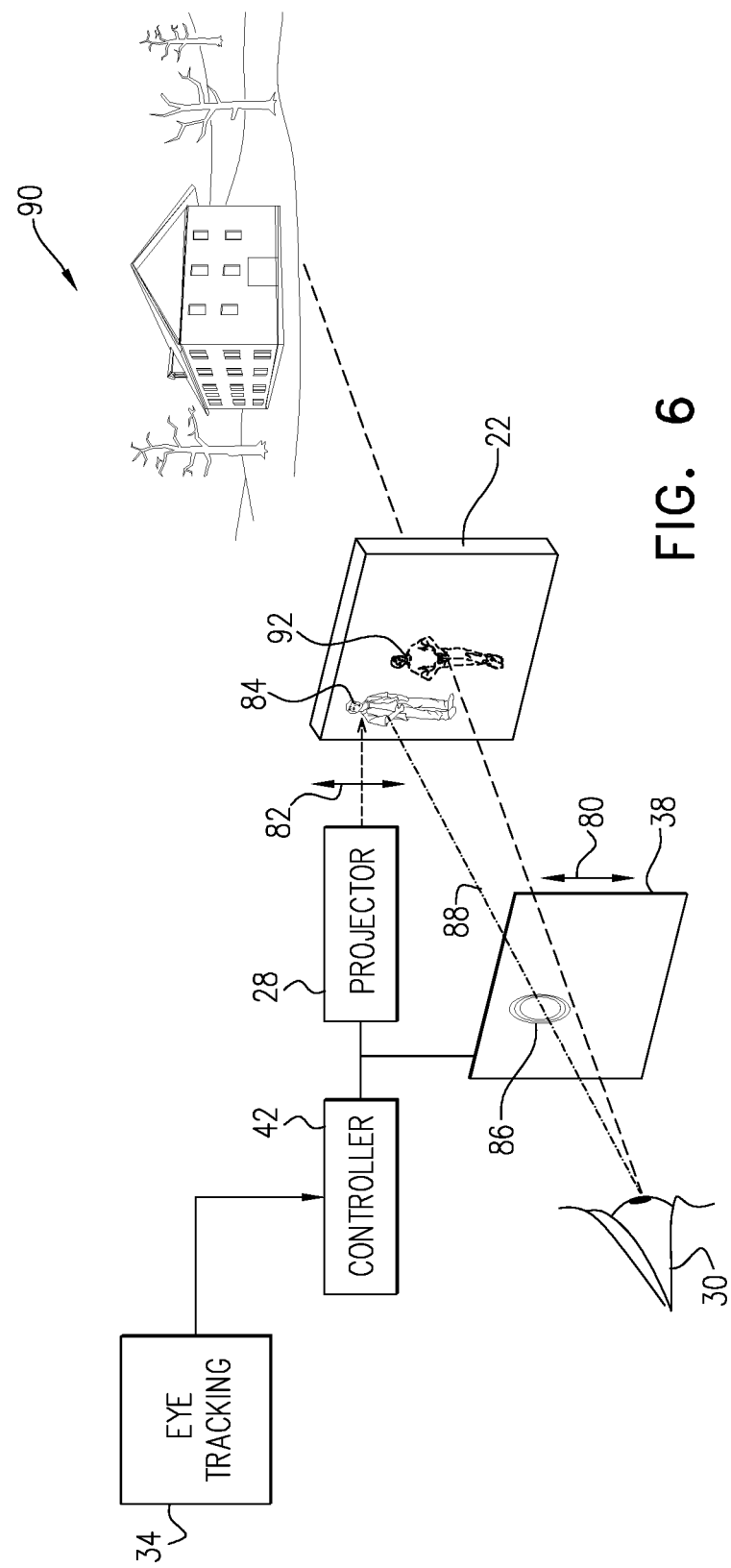
FIG. 6 is a schematic pictorial illustration of the operation of an augmented reality system incorporating an electrically-tunable lens, in accordance with an embodiment of the invention.

FIG. 6 is a schematic pictorial illustration of the operation of an augmented reality system incorporating an electrically-tunable lens, in accordance with an embodiment of the invention. This figure shows elements of system 20 (FIG. 1) in an exploded arrangement that is useful in understanding how optical phase modulators 38 in lens 32 operate in conjunction with display 22 so as to enable the viewer to observe an item 84 of interest in the image projected by display 22 while viewing a scene 90 through the display. As noted earlier, modulators 38 provide this functionality without the addition of a polarizer or additional electrically-tunable lens interposed in the path between the viewer's eye 30 and scene 90.

As explained in reference to FIGS. 1A/B, modulators 38 focus light only of a certain, predefined linear polarization, for example a vertical polarization, as illustrated by an arrow 80. Projector 28 projects light of this same polarization toward display 22, as illustrated by an arrow 82. Furthermore, controller 42 drives optical phase modulators 38 to generate a lens profile 86 (such as a Fresnel profile in the present example) only in a small area surrounding an axis 88 running from eye 30 to item 84. As noted above, controller 42 determines the angle of axis 88 and the refractive correction to be applied by lens profile 86 based on the content projected by display and/or the gaze direction indicated by eye tracker 34. Outside the limited area of lens profile 86, optical phase modulator 38 applies a constant phase modulation to the incident light, meaning that the optical phase modulator exerts no optical power over most of its area.

Most of the light coming from scene 90 will thus pass through optical phase modulators 38 unaffected: Optical phase modulator 38 has no effect at all on light of the polarization orthogonal to that indicated by arrow 80. Even light of the same polarization as that indicated by arrow 80 will be largely unaffected outside the area of lens profile 86. It is therefore desirable that the area of the lens profile be kept small, encompassing item 84 but extending only minimally beyond the bounds of the item of interest. For example, the area over which the refractive correction is applied may have an angular width, relative to the eye, that is no greater than 5°. Thus, when the viewer looks at item 84, he or she will see it in good focus, thanks to lens profile 86; whereas the viewer will see scene 90 clearly over all the remaining field of view.

In order to avoid optical artifacts at the edges of lens profile 86, it can be useful to drive optical phase modulator 38 to create a region in which the optical power is gradually reduced around the periphery of profile 86, for example as described in the above-mentioned PCT Patent Application PCT/IB2018/054957 (referring to FIGS. 9A-9E in that application). As a result, an item 92 falling in or around the periphery of profile 86 may appear distorted to the viewer, thus causing an undesirable visual distraction. To mitigate this sort of problem, controller 34 instructs projector 28 to digitally blur parts of the projected image, such as item 92, that are projected outside the viewing aperture of profile 86. Because item 92 falls outside the area of sharp foveal vision of eye 30, the viewer will not be disturbed by the blur.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
   a transparent envelope;
   an electro-optical layer, contained within the envelope and having an effective local index of refraction at any given location that is determined by a voltage waveform applied across the electro-optical layer at the location;
   an array of excitation electrodes disposed over a surface of the transparent envelope; and
   control circuitry, which is configured to apply voltage waveforms to the excitation electrodes so as to generate across at least a part of the active area of the electro-optical layer a phase modulation profile comprising spatially alternating peaks and troughs separated by phase transitions chosen so as to emulate a Fresnel lens, while the troughs have respective phase modulation depths that vary by at least one quarter wavelength at a nominal wavelength of 500 nm across at least the part of the active area of the electro-optical layer that emulates the Fresnel lens.

2. The apparatus according to claim 1, wherein the respective phase modulation depths of the troughs vary by at least one half wavelength at the nominal wavelength across the part of the active area of the electro-optical layer that emulates the Fresnel lens.

3. The apparatus according to claim 1, wherein the phase transitions have respective amplitudes that increase monotonically from a central zone of the Fresnel lens outward toward a periphery of the part of the active area of the electro-optical layer that emulates the Fresnel lens.

4. The apparatus according to claim 1, wherein the phase modulation depths at the troughs in at least a central zone of the Fresnel lens are at least four wavelengths of light at the nominal wavelength.

5. The apparatus according to claim 1, wherein the peaks have respective peak phase modulations that vary across the part of the active area of the electro-optical layer that emulates the Fresnel lens by at least one quarter wavelength at the nominal wavelength.

6. The apparatus according to claim 1, wherein the array of excitation electrodes has an average pitch, and the peaks in the phase modulation profile are spaced apart by integer multiples of a value that is at least three times the average pitch.

7. The apparatus according to claim 1, wherein the phase modulation profile comprises a phase modulation over at least 90% of the part of the active area emulating the Fresnel lens that is less than 70% of an available dynamic phase modulation range of the electro-optical layer.

8. The apparatus according to claim 1, wherein the excitation electrodes comprise parallel conductive stripes extending across a first surface of the transparent envelope, and the apparatus comprises a transparent common electrode on a second surface of the transparent envelope, opposite the first surface, and wherein the control circuitry is configured to apply the voltage waveforms to the excitation electrodes so that the phase modulation profile emulates a cylindrical Fresnel lens.

9. The apparatus according to claim 1, wherein the control circuitry is configured to modify the voltage waveforms so as to change a focal power of the Fresnel lens emulated by the phase modulation profile.

10. The apparatus according to claim 1, wherein the control circuitry is configured to modify the voltage waveforms so as to shift an optical center of the Fresnel lens emulated by the phase modulation profile.

11. The apparatus according to claim 10, wherein the control circuitry is configured to apply the voltage waveforms so that outside the part of the active area that is in proximity to the optical center of the Fresnel lens, the electro-optical layer applies a constant phase modulation to light that is incident on the apparatus.

12. The apparatus according to claim 1, wherein the electro-optical layer comprises a liquid crystal.

13. A method for optical correction, comprising:
providing an electro-optical modulator comprising a transparent envelope containing an electro-optical layer having an effective local index of refraction at any given location that is determined by a voltage waveform applied across the electro-optical layer at the location, with an array of excitation electrodes disposed over a surface of the transparent envelope; and
applying voltage waveforms to the excitation electrodes so as to generate across at least a part of the active area of the electro-optical layer a phase modulation profile comprising spatially alternating peaks and troughs separated by phase transitions chosen so as to emulate a Fresnel lens, while the troughs have respective phase modulation depths that vary by at least one quarter wavelength at a nominal wavelength of 500 nm across at least the part of the active area of the electro-optical layer that emulates the Fresnel lens.

14. The method according to claim 13, wherein the respective phase modulation depths of the troughs vary by at least one half wavelength at the nominal wavelength across the part of the active area of the electro-optical layer that emulates the Fresnel lens.

15. The method according to claim 13, wherein the phase transitions have respective amplitudes that increase monotonically from a central zone of the Fresnel lens outward toward a periphery of the part of the active area of the electro-optical layer that emulates the Fresnel lens.

16. The method according to claim 13, wherein the phase modulation depths at the troughs in at least a central zone of the Fresnel lens are at least four wavelengths of light at the nominal wavelength.

17. The method according to claim 13, wherein the peaks have respective peak phase modulations that vary across the part of the active area of the electro-optical layer that emulates the Fresnel lens by at least one quarter wavelength at the nominal wavelength.

18. The method according to claim 13, wherein the array of excitation electrodes has a predefined pitch, and the peaks in the phase modulation profile are spaced apart by integer multiples of the pitch.

19. The method according to claim 13, wherein the phase modulation profile comprises a phase modulation over at least 90% of the part of the active area emulating the Fresnel lens that is less than 70% of an available dynamic phase modulation range of the electro-optical layer.

20. The method according to claim 13, wherein the excitation electrodes comprise parallel conductive stripes extending across a first surface of the transparent envelope, and wherein the electro-optical modulator comprises a transparent common electrode on a second surface of the transparent envelope, opposite the first surface, and wherein applying the voltage waveforms comprises selecting the voltage waveforms so that the phase modulation profile emulates a cylindrical Fresnel lens.

21. The method according to claim 13, wherein applying the voltage waveforms comprises modifying the voltage waveforms so as to change a focal power of the Fresnel lens emulated by the phase modulation profile.

22. The method according to claim 13, wherein applying the voltage waveforms comprises modifying the voltage waveforms so as to shift an optical center of the Fresnel lens emulated by the phase modulation profile.

23. The method according to claim 22, wherein applying the voltage waveforms comprises setting the voltage waveforms so that outside the part of the active area that is in proximity to the optical center of the Fresnel lens, the electro-optical layer applies a constant phase modulation to light that is incident on the electro-optical modulator.

24. The method according to claim 13, wherein the electro-optical layer comprises a liquid crystal.

25. Optical apparatus, comprising:
a transparent envelope;
an electro-optical layer, contained within the envelope and having an effective local index of refraction at any given location that is determined by a voltage waveform applied across the electro-optical layer at the location, having an available dynamic phase modulation range determined by a thickness and a range of effective local index of refraction of the electro-optical layer;
an array of excitation electrodes disposed over a surface of the transparent envelope; and
control circuitry, which is configured to apply voltage waveforms to the excitation electrodes so as to generate across at least a part of the active area of the electro-optical layer a phase modulation profile comprising spatially alternating peaks and troughs separated by phase transitions chosen so as to emulate a Fresnel lens, while applying a phase modulation over at least 90% of the part of the active area emulating the Fresnel lens that is less than 70% of the available dynamic phase modulation range of the electro-optical layer.

26. The apparatus according to claim 25, wherein the phase modulation applied over at least 90% of the part of the active area emulating the Fresnel lens is less than 50% of the dynamic phase modulation range of the electro-optical layer.

27. The apparatus according to claim 25, wherein the voltage waveforms are chosen so that an unused lower part of the available dynamic phase modulation range below the troughs has an extent that is larger than an unused upper part of the available dynamic phase modulation range above the peaks.

28. The apparatus according to claim 27, wherein the extent of the unused lower part of the available dynamic phase modulation range below the troughs is larger than twice the unused upper part of the available dynamic phase modulation range above the peaks.

29. A method for optical correction, comprising:
providing an electro-optical modulator comprising a transparent envelope containing an electro-optical layer having an effective local index of refraction at any given location that is determined by a voltage waveform applied across the electro-optical layer at the location, with an array of excitation electrodes disposed over a surface of the transparent envelope, the electro-optical modulator having an available dynamic phase modulation range determined by a thickness and a range of effective local index of refraction of the electro-optical layer; and applying voltage waveforms to the excitation electrodes so as to generate across at least a part of the active area of the electro-optical layer a phase modulation profile comprising spatially alternating peaks and troughs separated by phase transitions chosen so as to emulate a Fresnel lens, while applying a phase modulation over at least 90% of the part of the active area emulating the Fresnel lens that is less than 70% of the available dynamic phase modulation range of the electro-optical layer.

30. The method according to claim 29, wherein the phase modulation applied over at least 90% of the part of the active area emulating the Fresnel lens is less than 50% of the dynamic phase modulation range of the electro-optical layer.

31. The method according to claim 29, wherein the voltage waveforms are chosen so that an unused lower part of the available dynamic phase modulation range below the troughs has an extent that is larger than an unused upper part of the available dynamic phase modulation range above the peaks.

32. The method according to claim 31, wherein the extent of the unused lower part of the available dynamic phase modulation range below the troughs is larger than twice the unused upper part of the available dynamic phase modulation range above the peaks.

* * * * *